(12) United States Patent
Galvin

(10) Patent No.: US 9,250,706 B1
(45) Date of Patent: Feb. 2, 2016

(54) SIGNATURE SYSTEM

(71) Applicant: Padraig Galvin, Hyannis, MA (US)

(72) Inventor: Padraig Galvin, Hyannis, MA (US)

( * ) Notice: Subject to any disclaimer, the term of this patent is extended or adjusted under 35 U.S.C. 154(b) by 431 days.

(21) Appl. No.: 13/726,999

(22) Filed: Dec. 26, 2012

(51) Int. Cl.
*G06F 3/01* (2006.01)

(52) U.S. Cl.
CPC ...................................... *G06F 3/017* (2013.01)

(58) Field of Classification Search
CPC ...................................................... H04L 9/3247
See application file for complete search history.

(56) References Cited

U.S. PATENT DOCUMENTS

| | | | |
|---|---|---|---|
| 4,491,960 A | 1/1985 | Brown | |
| 5,933,526 A | 8/1999 | Sklarew | |
| 6,137,836 A | 10/2000 | Haataja | |
| 7,810,155 B1 * | 10/2010 | Ravi | ................................ 726/22 |
| 8,504,842 B1 * | 8/2013 | Meacham | ..................... 713/183 |
| 2004/0061287 A1 | 4/2004 | Vaillancourt | |
| 2008/0141117 A1 * | 6/2008 | King et al. | ..................... 715/238 |
| 2009/0058860 A1 | 3/2009 | Fong et al. | |
| 2009/0149156 A1 * | 6/2009 | Yeo | ............................... 455/411 |
| 2010/0031200 A1 * | 2/2010 | Chen | ................... G06F 3/04883 715/863 |
| 2011/0055579 A1 * | 3/2011 | Cohen | .......................... 713/176 |
| 2012/0035909 A1 | 2/2012 | Engelsen | |

* cited by examiner

*Primary Examiner* — Stephen Hong
*Assistant Examiner* — Sanchita Roy
(74) *Attorney, Agent, or Firm* — Goldstein Law Offices, P.C.

(57) ABSTRACT

A system and method for creating a unique signature, discrete from underpinning symbols, using a template having a plurality of symbols in an array and a continuous line connecting a defined order of a sequence of symbols on the template, the continuous line connecting all symbols in the sequence, the line forming a signature, discrete from the symbols and the template of symbols. The user selectively chooses the sequence of symbols defined by a name, nickname, username or ID number. The line has a plurality of segments, each having a span fillable with a graphic pattern and a plurality of colors. In one embodiment, the unique signature is created electronically by inputting the defined order of the sequence of symbols. When the user is a signatory to a document inserts the unique signature into the document, the unique signature indicates the document has been signed by the user.

15 Claims, 3 Drawing Sheets

SIGNATURE SYSTEM

TECHNICAL FIELD

The present disclosure relates generally to a system and a method for creating a unique signature. More particularly, the present disclosure relates to a system and a method for creating a unique signature, discrete from a plurality of symbols.

BACKGROUND

Seals were used in the earliest civilizations to authenticate a document, a wrapper for the document, or the cover of a container or package holding valuables or other objects. With the advent of writing, people started using a signature, using symbols based on an alphabet with or without the seal.

The traditional function of a signature is evidential; it is to give evidence of the origin of the document and the intention of an individual with regard to that document.

Legally acceptable signatures have varied from a simple "X" to elaborate flowing, cursive writing using the Latin alphabet. In some cultures, an ideograph printed by a chop acts as a signature.

However a document is signed, a person's signature has always been considered idiosyncratic to the individual, difficult to forge without detection and providing evidence of identity and will. Electronic documents that require a signature present new challenges to preserve the purpose of the signature.

While these methods and systems may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system for creating a unique signature that is discrete from symbols. Accordingly, an aspect of an example embodiment in the present disclosure provides a template having a plurality of symbols in an array and a continuous line connecting a defined order of a sequence of symbols on the template, the line forming a signature discrete from the symbols.

Another aspect of an example embodiment in the present disclosure is to provide a system for creating a unique signature for electronic signing. Accordingly, an aspect of an example embodiment in the present disclosure provides a unique signature, created electronically by inputting a defined order of a sequence of symbols on a template in an electronic device, connecting the symbols thereby forming a continuous line, creating a signature.

A further aspect of an example embodiment in the present disclosure is to provide a system for creating a unique signature having a plurality of different segments. Accordingly, an aspect of an example embodiment in the present disclosure provides a continuous line having a plurality of segments, each segment having a fillable span, the span fillable with at least one pattern and at least one color.

Yet another aspect of an example embodiment in the present disclosure is to provide a system for creating a unique signature that is fixable in a tangible medium, creating a personal design mark. Accordingly, an aspect of an example embodiment in the present disclosure provides a continuous line having a plurality of segments, each segment having a fillable span, the span fillable with at least one pattern and at least one color, the pattern and color chosen by a user, creating a unique personal design mark for use on jewelry, clothing and accessories.

The present disclosure describes a system and a method for creating a unique signature, discrete from underpinning symbols, using a template having a plurality of symbols in an array and a continuous line connecting a defined order of a sequence of symbols on the template, the continuous line connecting all symbols in the sequence, the line forming a signature, discrete from the symbols and the template of symbols. The user selectively chooses the sequence of symbols in the order selectively defined by a name, nickname, username or numerical ID. The line has a plurality of segments, each having a span selectively fillable with a graphic pattern and a plurality of colors. In one embodiment, the unique signature is created electronically by inputting the defined order of the sequence of symbols and securely stored electronically. When the user is a signatory to a document, the user inserts the unique signature into the document, indicating the user has signed the document.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
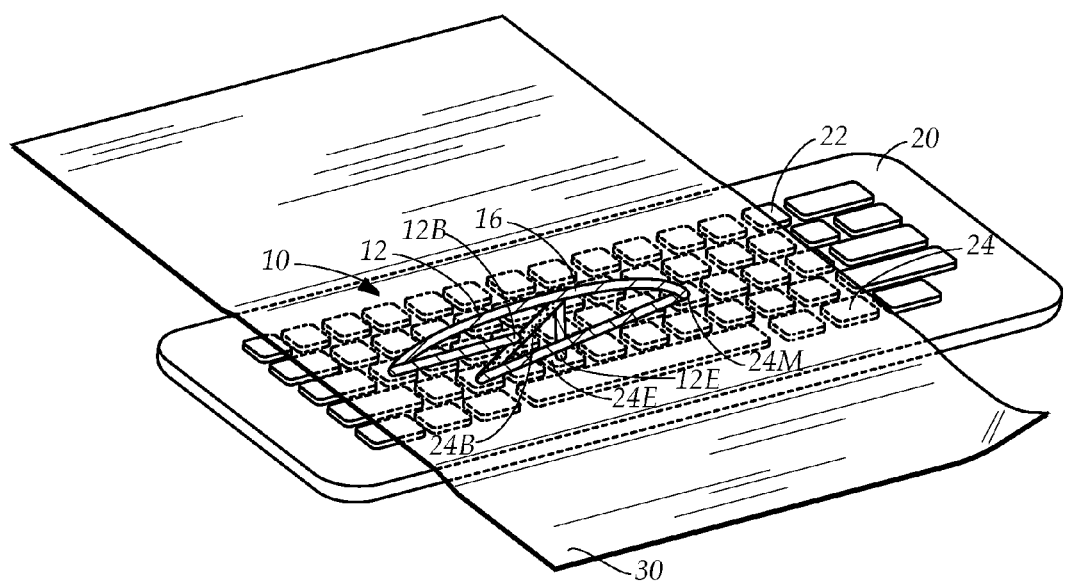
FIG. 1 is a diagrammatic perspective view of a system for creating a unique signature, using a keyboard and a sheet of paper.

FIG. 1 illustrates a system and method for creating a unique signature 10, the signature discrete from a plurality of symbols. The signature is idiosyncratic to a user. The unique signature is created directly on a document by the method described hereinbelow. The document can be printed on paper, securely stored electronically and electronically inserted into a document.

The system has a template 20 having the plurality of symbols in an array. In the illustration, the template is a QWERTY keyboard 22 having a customary layout of symbols of a plurality of letters of an alphabet, numbers, punctuation marks and typographic characters. The layout of the QWERTY keyboard using the Latin letters is understood by those of ordinary skill and therefore the symbols are not shown. In this example embodiment, the alphabet is, for example, the Latin alphabet, but the system is not limited to the Latin alphabet and is useful with any other alphabet, such as, for example, but not limited to, Hebrew, Arabic, Cyrillic, and Greek. It is further understood that the template can have other non-QWERTY arrays of symbols and further example embodiments are not limited to QWERTY arrays.

The system has a sheet 30 of paper overlaying the keyboard. On the sheet is a continuous line 12 forming the unique signature 10. The line is a straight or curved continuous extent of length. The line is created by tracing a path from a first symbol to a next symbol, continuing to a last symbol, following a defined order. In one embodiment, the user traces the line on the sheet using a writing instrument.

When the sheet is removed from the keyboard 22, the signature 10 is discreet from the template 20 and symbols of the system.

The continuous line 12 connects a sequence of symbols on the template 20, the sequence having a defined order, representing, as a non-limiting example, a name, username nickname, numerical identification such as a Social Security number or other sequences selected by the user to represent identity. The sequence includes a beginning symbol 24B, in the illustration, an "F", at least one intervening symbol 24M, a "K", and an ending symbol 24E, in the illustration, a "V". The line has a beginning 12B at the beginning symbol 24B, the line 12 connecting the beginning symbol 24B to the at least one intervening symbol 24M, the line connecting each intervening symbol in the sequence to the next intervening symbol in the sequence, until the next intervening symbol connects to the ending symbol 24E, the ending symbol having no next intervening symbol in the sequence, the continuous line 12 connecting all symbols in the sequence, the line having an ending 12E at the ending symbol 24E, the line forming a unique signature, discrete from the symbols and the template of symbols underpinning the signature.

Figure 3:
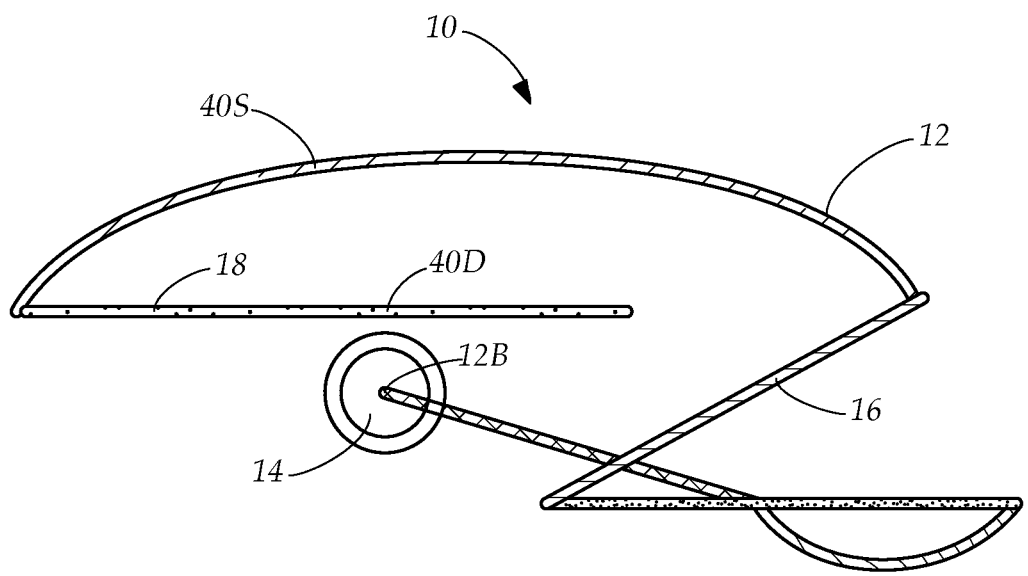
FIG. 3 is a front elevational view of a signature in the system.

Referring to FIG. 3, the line 12 has a plurality of segments 16, each segment connecting one symbol 24 to the next symbol 24. Each segment has a span 18, defined by the width of the line. In one example embodiment, within each span, the segment has optionally a graphic pattern 40, selected by the user. A span filled with at least one color is a pattern in this disclosure. The graphic pattern in a first line segment is independent from the graphic pattern in a second line segment. Each segment has at least one color, selected by a user. All segments of the line can have the same pattern or the line can have at least one segment having a different pattern from other segments.

In the illustration, a striped graphic pattern 40S and a dotted graphic pattern 40D are depicted. It is understood by those of ordinary skill that the style and colors of the graphic patterns are not limited. As non-limiting examples, the graphic pattern can be flowers, hearts, bows, pistols, barbwire, abstract patterns, a plurality of colors, and color blends such as camouflage.

In another example embodiment, the segment has at least one color, selected by a user. Black is included as a color in this disclosure. The color in the first line segment is independent from the color in the second line segment. All segments of the line can have the same color or the line can have at least one segment having a different color from other segments. An illustration of different color segments is not provided in the black and white drawings.

In a further example embodiment, the system includes a beginning indicator 14 at the line beginning, designating where the line 12 begins. It is understood in a further example embodiment that the system includes an ending indicator at the line ending, designating where the line ends.

Figure 4:
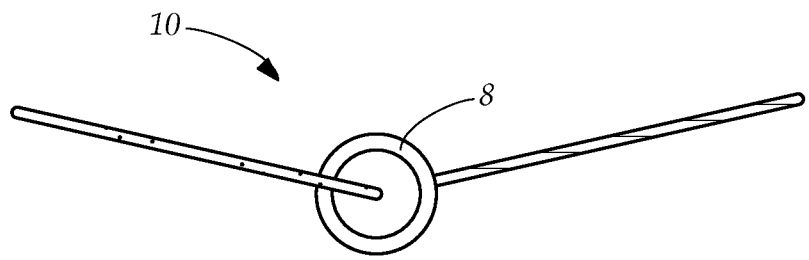
FIG. 4 is a front elevational view of another signature in the system.

FIG. 4 shows another example embodiment of the system. The signature 10 includes a repeat mark 8, the repeat mark indicating the symbol is immediately repeated in the sequence. The concentric repeat mark and indicator are shown to appear the same, however it is understood that these are non-limiting examples for the purpose of illustration and that other types of marks can be selected for use with the line segments to indicate line beginning, line end and repeating symbols.

Figure 2:
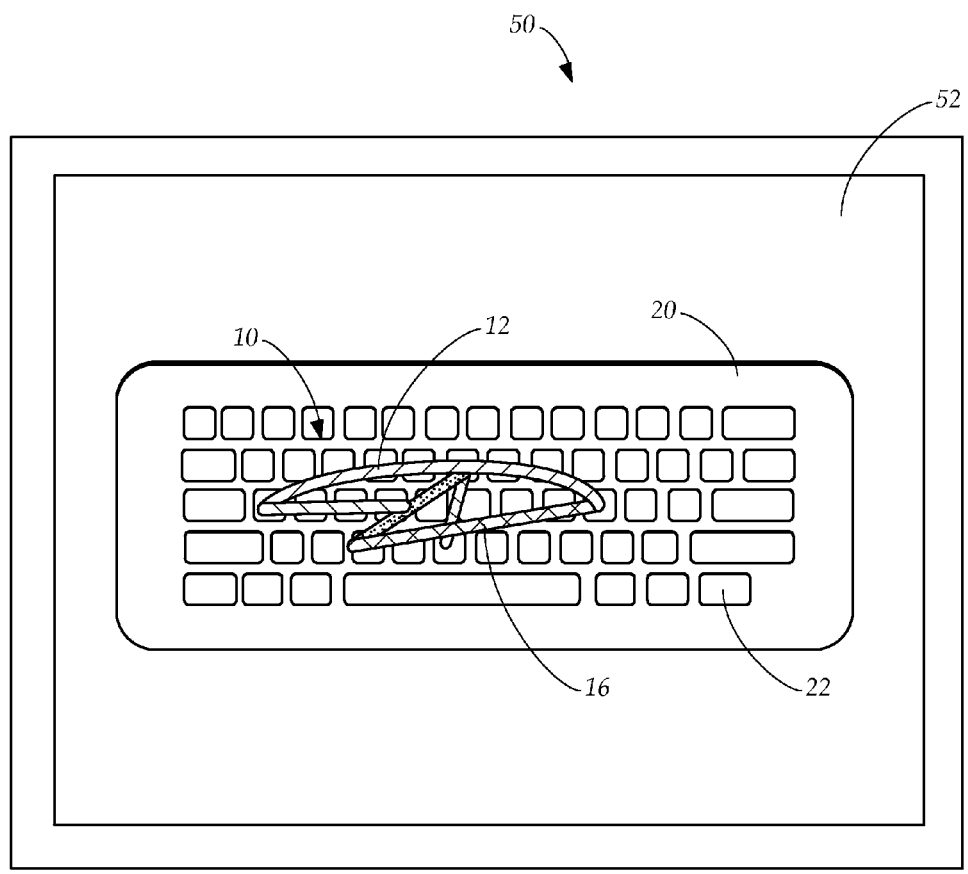
FIG. 2 is a front elevational view of the system for creating a unique signature, using a tablet computer.

FIG. 2 shows an electronic system for creating the signature. The signature is created on an electronic tablet 50 having a screen 52 with the template 20 displayed thereon. The template displayed as a non-limiting example is a QWERTY keyboard, as explained hereinabove. The continuous line 12 is formed by inputting the defined order of the sequence of symbols. Drawing on the screen directly by tracing the line or touching the symbols or typing onto a keyboard are non-limiting examples of inputting the order of the sequence. The spans 18 of the segments 16 are selectively filled with color and patterns, using an electronic drawing application, which is well known to those of ordinary skill. Once the sequence is finished and the spans selectively filled by the user, creating a unique signature 10 the line is securely stored electronically.

When the user is a signatory to a document, the user securely electronically inserts the unique signature into the document, indicating the document has been signed by the user evidencing identity and will of the user. When the user is required to provide evidence of identity, such as when conducting a commercial transaction electronically, transmitting the unique signature securely provides authentication to the transaction.

As shown in FIG. 2, a method for signing a document with a unique signature, comprises a user choosing a template having a plurality of symbols in an array. As explained hereinabove, the array is not limited to a QWERTY keyboard, but can be any array of symbols of the alphabet as established by the system, and the alphabet is not limited to the Latin alphabet. The user connects a sequence of symbols on the template with a continuous line, the sequence having a defined order including a beginning symbol, at least one intervening symbol and an ending symbol, connecting the beginning symbol to the at least one intervening symbol, the intervening symbol the next symbol in the sequence, connecting each intervening symbol in the sequence to the next intervening symbol in the sequence, until the next intervening symbol connects to the ending symbol, the ending symbol having no next intervening symbol in the sequence, the continuous line forming a unique signature discrete from the symbols underpinning the signature. The continuous line has the plurality of segments, each with a span as explained hereinabove. The user chooses the patterns and colors to fill the spans of the segments.

The step of choosing a template is preceded by the step of the user selectively choosing the sequence of symbols in the defined order, for a non-limiting example, the order defined by a name, nickname, username or numerical identification.

The user inserts the unique signature into a document, indicating the document has been signed by a user. In one example embodiment, the sheet of paper containing the document is placed directly on the template and the continuous line is traced with a writing implement directly onto the document.

When the unique signature is created electronically on a computing device, the step of choosing the template includes the step of displaying the template on a screen and the step of connecting a sequence of symbols on the template with a continuous line includes the step of inputting the defined order of the sequence of symbols on the template.

The step of connecting a sequence of symbols on the template with a continuous line is followed by the step of storing securely the unique signature electronically.

The step of storing securely the unique signature electronically is followed by the step of registering the unique signature as a legal signature of the user.

Upon creation of the unique signature of the user, the signature can be further fixed into a tangible medium, such as for a non-limiting example, jewelry and fabric. The signature can be further used as a design mark imprinted on casual wear such as tee shirts, caps, sweatshirts and other clothing.

In a further embodiment, upon creation of the graphic form of the unique signature electronically on a computing device, the user optionally can include sound tones, the signature having at least one tone along with a unique pattern and color, so when the user sends a message to another electronic device such as, for example, but not limited to, a cell phone, or to other media such as a social media account or an email account, a receiver will hear the tone and recognize the user, similar to recognizing a favorite song with just a first two or three notes of music.

The tones are note limited to musical notes but can be, for example, but not limited to, a animal noise such as a lion's roar, a mechanic noise, such as an engine revving or a natural noise, such as thunder. A signature can selectively have a tone for each letter and symbol but the signature is not limited to at least one tone for each individual letter and symbol. As a non-limiting example, a signature has ten symbols but the signature has only three or four tones associated with the signature. As a further non-limiting example, more than one tone can be selectively associated with each symbol, so that the ten symbol signature has ten or more tones associated with the signature. Alternatively, a popular song can be associated with the signature.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a system and a method for creating a unique signature, discrete from a plurality of symbols. The disclosure is illustrated by example in the drawing figures, and throughout the written description. It should be understood that numerous variations are possible, while adhering to the inventive concept. Such variations are contemplated as being a part of the present disclosure.

What is claimed is:

1. A system for creating a unique signature, the signature discrete from underpinning symbols, comprising a processor, and a computer readable storage medium storing instructions thereon that, when executed by the processor, cause the system to perform a method comprising the steps of:

displaying a template having a plurality of symbols in an array, wherein the template of symbols is a keyboard or the template of symbols is displayed on a screen;

receiving user input of a sequence of the symbols in the array to form the unique signature, wherein the sequence has an order including a beginning symbol, at least one intervening symbol and an ending symbol;

generating and drawing a continuous line on the screen, wherein the line connects the positions of all the received symbols in the order input by the user, to form a unique signature discrete from the underpinning symbols and the template of symbols;

wherein the unique signature is electronically generated by the processing device and is securely stored electronically; and wherein the system is configured to insert the unique signature into a document, indicating the document has been signed by the user.

2. The system for creating a unique signature as described in claim 1, wherein the symbols of the template of symbols are letters in an alphabet, numbers, punctuation marks and typographic characters.

3. The system for creating a unique signature as described in claim 1, wherein the template of symbols is a QWERTY keyboard array.

4. The system for creating a unique signature as described in claim 1, wherein the continuous line includes a plurality of segments.

5. The system for creating a unique signature as described in claim 4, wherein at least one segment has a pattern.

6. The system for creating a unique signature as described in claim 5, wherein the at least one segment has at least one color.

7. The system for creating a unique signature as described in claim 6, wherein the signature includes the at least one segment has a pattern different from the pattern of a second segment.

8. The system for creating a unique signature as described in claim 7, wherein the at least one segment has a color different from a color of the second segment.

9. The system for creating a unique signature as described in claim 8, wherein the signature includes an indicator, the indicator at the line beginning, designating where the line begins.

10. The system for creating a unique signature as described in claim 9, wherein the unique signature includes a sign mark, the sign mark at the line ending, indicating where the line ends.

11. The system for creating a unique signature as described in claim 10, wherein the unique signature includes a repeat mark, the repeat mark indicating the symbol is immediately repeated in the sequence.

12. A method for signing a document with a unique signature, the signature discrete from underpinning symbols, comprising:

choosing a template having a plurality of symbols in an array, wherein the template of symbols is a keyboard or the template of symbols is displayed on a screen;

drawing a continuous line on a screen by inputting an ordered sequence of the symbols in the array, wherein the line is created electronically on a computer device, forming a unique signature by connecting the positions of all the received symbols in the input order, discrete from the template of symbols in the array, and the sequence has an order including a beginning symbol, at least one intervening symbol and an ending symbol;

securely storing the unique signature electronically; and inserting the unique signature into a document, indicating the document has been signed by a user.

13. The method for signing a document with a unique signature as described in claim 12, wherein the step of choosing the template of symbols includes a step of displaying the template of symbols on a screen.

14. The method for signing a document with a unique signature as described in claim 12, wherein the step of storing securely the unique signature electronically is followed by a step of registering the unique signature as a legal signature of the user.

15. The method for signing a document with a unique signature as described in claim 14, wherein the continuous line has a plurality of segments, each having a span, and wherein the step of drawing a line on screen by inputting the sequence of the symbols in the array includes a step of choosing patterns and colors to fill the spans of the segments.

\* \* \* \* \*